(12) United States Patent
Kemppainen (10) Patent No.: US 12,457,488 B2
(45) Date of Patent: Oct. 28, 2025

(54) METHOD AND APPARATUS FOR IDENTITY COLLECTION

(71) Applicant: EXFO OY, Oulu (FI)

(72) Inventor: Jukka Kemppainen, Oulu (FI)

(73) Assignee: EXFO OY, Oulu (FI)

( * ) Notice: Subject to any disclaimer, the term of this patent is extended or adjusted under 35 U.S.C. 154(b) by 355 days.

(21) Appl. No.: 18/335,708

(22) Filed: Jun. 15, 2023

(65) Prior Publication Data

US 2023/0422018 A1    Dec. 28, 2023

Related U.S. Application Data

(60) Provisional application No. 63/416,132, filed on Oct. 14, 2022, provisional application No. 63/354,777, filed on Jun. 23, 2022.

(51) Int. Cl.
*H04W 8/20*    (2009.01)
*H04W 60/00*   (2009.01)
*H04W 76/30*   (2018.01)

(52) U.S. Cl.
CPC .......... *H04W 8/205* (2013.01); *H04W 60/00* (2013.01); *H04W 76/30* (2018.02)

(58) Field of Classification Search
CPC ..... H04W 8/205; H04W 60/00; H04W 76/30; H04W 12/037; H04W 12/72; H04W 12/80
See application file for complete search history.

(56) References Cited

U.S. PATENT DOCUMENTS 10,368,239 B2 * 7/2019 Jover .................. H04K 1/00
10,638,324 B2 * 4/2020 Kemppainen ......... H04L 63/304
10,863,353 B2   12/2020 Ainali et al.
(Continued)

FOREIGN PATENT DOCUMENTS

EP    3208990 A1    8/2017
EP    3 576 366 B1  6/2021
(Continued)

OTHER PUBLICATIONS

3rd Generation Partnership Project (3GPP), "3rd Generation Partnership Project; Technical Specification Group Services and System Aspects; Security; Protocol and procedures for Lawful Interception (LI); Stage 3 (Release 17)," Jun. 16, 2022, pp. 1-350.
Oct. 20, 2023, European Search Report issued for European Patent Application No. EP 23 17 9437.
Unknown, "Security architecture and procedures for 5G system (Release 15); 3GPP TS 33.501 VIS.0.0",3rd Generation Partnership Project (3GPP) Standard, pp. 1-128, (Mar. 26, 2018).
(Continued)

*Primary Examiner* — Ankur Jain
(74) *Attorney, Agent, or Firm* — Baratta Law PLLC; Lawrence A. Baratta, Jr.

(57) ABSTRACT

Method and arrangement for collecting subscriber identity is presented. A communication intelligence cell is formed for carrying out uplink and downlink communication with cellular mobile devices. The cell is connected to the identity query interface of the cellular network operator. An encrypted subscriber identity of the cellular mobile device is received from a mobile device. A radio connection to the mobile device is closed. A second registration request with a temporary identity of the cellular mobile device is received from the mobile device. An identity query with the temporary identity of the mobile device is transmitted to the identity query interface and permanent identity of the mobile device is received from the query interface.

20 Claims, 8 Drawing Sheets

(56) References Cited

U.S. PATENT DOCUMENTS

| | | | |
|---|---|---|---|
| 10,904,822 B2* | 1/2021 | Timson | H04W 48/16 |
| 2010/0197305 A1 | 8/2010 | Atarius et al. | |
| 2010/0267373 A1 | 10/2010 | Engstrom | |
| 2015/0334630 A1 | 11/2015 | McTernan et al. | |
| 2016/0295432 A1 | 10/2016 | Tang et al. | |
| 2017/0206351 A1* | 7/2017 | Jay | H04W 12/088 |
| 2017/0366388 A1* | 12/2017 | Begeer | H04L 63/0892 |
| 2018/0232533 A1* | 8/2018 | Egorov | H04L 9/00 |
| 2018/0367978 A1* | 12/2018 | Targali | H04L 63/0823 |
| 2018/0367998 A1* | 12/2018 | Kunz | H04W 24/10 |
| 2019/0068651 A1* | 2/2019 | Briggs | H04W 12/68 |
| 2019/0110205 A1* | 4/2019 | Shaik | H04W 36/0085 |
| 2019/0268759 A1* | 8/2019 | Targali | H04L 9/0825 |
| 2019/0349765 A1* | 11/2019 | Kolekar | H04W 12/068 |
| 2019/0364430 A1* | 11/2019 | Ainali | H04W 8/20 |
| 2022/0015013 A1* | 1/2022 | Timson | H04W 24/10 |
| 2022/0338016 A1* | 10/2022 | Goldfarb | H04W 12/72 |

FOREIGN PATENT DOCUMENTS

| | | |
|---|---|---|
| EP | 3573304 B1 | 3/2022 |
| EP | 3 866 544 B1 | 6/2022 |
| WO | 2021151497 A1 | 8/2021 |
| WO | 2022029141 A1 | 2/2022 |
| WO | 2022112438 A1 | 6/2022 |

OTHER PUBLICATIONS

Unknown, "Technical Realization of Service Based Architecture; Stage 3 (Release 15); 3GPP TS 29.500 V1 .1.0", 3rd Generation Partnership Project (3GPP) Standard, pp. 1-23, (Apr. 2018).

Unknown, Non-Access-Stratum (NAS) protocol for SG System (SGS); Stage 3 (Release 15); 3GPP TS 24.501 V1 .1.1, 3rd Generation Partnership Project (3GPP) Standard, pp. 1-290, (May 2018).

* cited by examiner

METHOD AND APPARATUS FOR IDENTITY COLLECTION

CROSS-REFERENCE

The present application claims priority to U.S. Provisional Patent Application No. 63/416,132, filed Oct. 14, 2022, and to U.S. Provisional Patent Application No. 63/354,777, filed Jun. 23, 2022, the contents of each are incorporated by reference in their entirety.

FIELD

The invention relates generally to collecting the identity of a subscriber terminal in use and specifically to an apparatus, and a method for performing the identity collection.

BACKGROUND

Collection of identities of cellular mobile devices is useful, when authorities need to locate a lost person who carries a cellular mobile phone or when they need to collect evidence of cellular device communication, for example. This is typically achieved using fake cellular base stations or Communication intelligence (ComInt) base stations to which the cellular mobile devices connect. These fake base stations or ComInt stations may be used to detect a subscriber identity. This procedure may be called International Mobile Subscriber Identity (IMSI) catching. However, in recent mobile phone systems, the subscriber identity is encrypted, whereby traditional detection methods do not work.

BRIEF DESCRIPTION

The present invention seeks to provide an improved method and an improved apparatus for collecting identities of cellular mobile devices.

According to an aspect of the present invention, there is provided an apparatus in a communication system comprising a transceiver, at least one processor; and at least one memory including computer program code, the at least one memory and computer program code configured to, with the at least one processor, cause the apparatus to: form a communication intelligence cell for carrying out uplink and downlink communication with cellular mobile devices, the cell having a physical cell identity and a tracking area code unused by neighboring real cells of a cellular network operator; connect the cell to the identity query interface of the cellular network operator; provide a downlink radio channel in the cell; receive a first registration request from a mobile device; receive an encrypted subscriber identity of the cellular mobile device sent from the mobile device; close radio connection to the mobile device; receive a second registration request from a mobile device; receive a temporary identity of the cellular mobile device sent from the mobile device; transmit identity query with the temporary identity of the mobile device to the identity query interface of the cellular network operator; receive permanent identity of the mobile device from the query interface; close radio connection to the mobile device.

According to an aspect of the present invention, there is provided an apparatus in a communication system comprising a transceiver, at least one processor; and at least one memory including computer program code, the at least one memory and computer program code configured to, with the at least one processor, cause the apparatus to: form a communication intelligence cell for carrying out uplink and downlink communication with cellular mobile devices, the cell having a physical cell identity and a tracking area code unused by neighboring real cells of a cellular network operator; connect the cell to the identity query interface of the cellular network operator; provide a downlink radio channel in the cell having a power level higher than downlink radio channel power level utilized in neighboring cells of the cellular network operator; receive a registration request from a mobile device, the request comprising an identity identifier of the mobile device; in response to the identity identifier being an encrypted subscriber identity, store said identity identifier in a database of said communication intelligence cell; in response to the identity identifier being a temporary identity, transmit an identity query with the temporary identity of the mobile device to the identity query interface of the cellular network operator, receive a permanent identity of the cellular mobile device from the query interface and store said temporary identity and said permanent identity in said database.

According to an aspect of the present invention, there is provided a method for identity collection of a mobile device, the method comprising: forming a communication intelligence cell for carrying out uplink and downlink communication with cellular mobile devices, the cell having a physical cell identity and a tracking area code unused by neighboring real cells of a cellular network operator; connecting the cell to the identity query interface of the cellular network operator; providing a downlink radio channel in the cell; receiving a first registration request from a mobile device; receiving an encrypted subscriber identity of the cellular mobile device sent from the mobile device; closing radio connection to the mobile device; receiving a second registration request from a mobile device; receiving a temporary identity of the cellular mobile device sent from the mobile device; transmitting identity query with the temporary identity of the mobile device to the identity query interface of the cellular network operator; receiving permanent identity of the mobile device from the query interface; closing radio connection to the mobile device.

According to an aspect of the present invention, there is provided a method for identity collection of a mobile device, the method comprising: forming a communication intelligence cell for carrying out uplink and downlink communication with cellular mobile devices, the cell having a physical cell identity and a tracking area code unused by neighboring real cells of a cellular network operator; connecting the cell to the identity query interface of the cellular network operator; providing a downlink radio channel in the cell having a power level higher than downlink radio channel power level utilized in neighboring cells of the cellular network operator; receiving a registration request from a mobile device, the request comprising an identity identifier of the mobile device; in response to the identity identifier being an encrypted subscriber identity, storing said identity identifier in a database of said communication intelligence cell; in response to the identity identifier being a temporary identity, transmitting an identity query with the temporary identity of the mobile device to the identity query interface of the cellular network operator, receiving a permanent identity of the cellular mobile device from the query interface and storing said temporary identity and said permanent identity in said database.

According to an aspect of the present invention, there is provided a non-transitory computer readable medium comprising program instructions for causing an apparatus to perform at least the following: forming a communication intelligence cell for carrying out uplink and downlink communication with cellular mobile devices, the cell having a physical cell identity and a tracking area code unused by neighboring real cells of a cellular network operator; connecting the cell to the identity query interface of the cellular net-work operator; providing a downlink radio channel in the cell; receiving a first registration request from a mobile device; receiving an encrypted subscriber identity of the cellular mobile device sent from the mobile device; closing radio connection to the mobile device; receiving a second registration request from a mobile device; receiving a temporary identity of the cellular mobile device sent from the mobile device; transmitting identity query with the temporary identity of the mobile device to the identity query interface of the cellular network operator; receiving permanent identity of the mobile device from the query interface; closing radio connection to the mobile device.

According to an aspect of the present invention, there is provided a non-transitory computer readable medium comprising program instructions for causing an apparatus to perform at least the following: forming a communication intelligence cell for carrying out uplink and downlink communication with cellular mobile devices, the cell having a physical cell identity and a tracking area code unused by neighboring real cells of a cellular network operator; connecting the cell to the identity query interface of the cellular network operator; providing a downlink radio channel in the cell having a power level higher than downlink radio channel power level utilized in neighboring cells of the cellular network operator; receiving a registration request from a mobile device, the request comprising an identity identifier of the mobile device; in response to the identity identifier being an encrypted subscriber identity, storing said identity identifier in a database of said communication intelligence cell; in response to the identity identifier being a temporary identity, transmitting an identity query with the temporary identity of the mobile device to the identity query interface of the cellular network operator, receiving a permanent identity of the cellular mobile device from the query interface and storing said temporary identity and said permanent identity in said database.

In an embodiment, the at least one memory and the computer program code configured to, with the at least one processor, cause the apparatus further to: provide a downlink radio channel having a power level higher than downlink radio channel power level utilized in neighboring cells of the cellular network operator.

In an embodiment, the at least one memory and the computer program code configured to, with the at least one processor, cause the apparatus further to: send a first registration reject to the mobile device with an error code indicating network error after receiving an encrypted subscriber identity of the mobile device and close radio connection to the mobile device based on said first registration reject.

In an embodiment, the at least one memory and the computer program code configured to, with the at least one processor, cause the apparatus further to: send a first registration reject to the mobile device; and reduce power level of the cell for a time period or switch off the cell for a given time period or switch the cell to barred for a given time period after sending the first registration reject to the mobile device.

In an embodiment, the at least one memory and the computer program code configured to, with the at least one processor, cause the apparatus further to: send a second registration reject to the mobile device with an error code indicating "no suitable cells in tracking area" after receiving permanent identity of the mobile device and close radio connection to the mobile device based on said second registration reject.

In an embodiment, the at least one memory and the computer program code configured to, with the at least one processor, cause the apparatus further to: store time stamp of the first registration request of the mobile device to database; transmit Radio Resource Control (RRC) User Equipment (UE) capability request to the mobile device after the first and second registration request; receive RRC UE capability information from the mobile device; compare the received RRC UE capability request messages after receiving the permanent identity of the mobile device and indicate potential matching identity of concealed identity and the permanent identity if a time period between the first and the second request has not exceeded.

The embodiments and features described in this specification that do not fall under the scope of the independent claims are to be interpreted as examples useful for understanding various embodiments of the invention.

BRIEF DESCRIPTION OF THE DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention.

Communication systems are developed in international co-operation with network manufacturers, operators, and national telecommunication authorities. 5G or New Radio, or NR, is one new communication systems in development by 3GPP (3rd Generation Partnership Project (3GPP)). In the first phase, 5G or NR operates in connection with 4G, in a non-standalone (NSA) environment, but later on stand-alone (SA) 5G or NR networks will emerge on the market.

Each cellular mobile device, user terminal (or user equipment, UE) hardware has a unique identifier. The identifier may be denoted as the permanent equipment identifier, PEI, or international mobile equipment identifier, IMEI.

A cellular mobile device wishing to utilize services of a wireless communication system such as a cellular network, needs to have a subscription from the operator of the communication system. Typically, a subscription is bound to a physical Universal Subscriber Identity Module, USIM, card and the subscription can be identified by a unique subscription permanent identifier, SUPI, denoted also as an international mobile subscriber identity, IMSI. SUPI consists of the mobile country code (MCC), mobile network code (MNC), and the mobile subscription identification number (MSIN).

There are also so-called embedded USIMs or electronic SIMs, eSIM, available. An eSIM is a digital USIM that allows the owner to activate a subscription to a communication system without having to use a physical USIM card.

To protect unauthorized use of SUPI, in many cellular systems, an alternate value that a cellular mobile device can use instead of the SUPI (whenever possible) to access the system network is used. This alternate identification is denoted Globally Unique Temporary Identifier GUTI or 5G-GUTI. Unlike a SUPI, a GUTI is not permanent and is changed into a new value whenever generated. A 5G S-Temporary Mobile Subscriber Identity (5G-S-TMSI) is a shortened version of the 5G-GUTI. It may be used to increase efficiency in some radio signaling procedures such as Paging and Service Request, for example.

In 5G systems, security specifications do not allow plain-text transmissions of SUPI over the radio interface. Instead, an encrypted identifier containing the concealed SUPI is transmitted. The 5G security specifications apply an Elliptic Curve Integrated Encryption Scheme (ECIES)—based privacy-preserving identifier to conceal the SUPI for transmission. This concealed SUPI is known as SUCI (Subscription Concealed Identifier). There are two possible schemes or profiles of ECIES used in 5G, denoted as ECIES scheme or profile A and ECIES scheme or profile B.

The SUCI is a one-time use, encrypted subscription identifier. User Equipment (UE) calculates a fresh SUCI from the SUPI using the Home Network Public Key. The encrypted SUCI prevents eavesdropping of the mobile phone identity from the radio interface between the cellular mobile device and the 5G New Radio (NR) base station.

It has been considered important that authorities may, in certain situations, in accordance with the applicable national or regional laws, perform Lawful Interception (LI) in communication systems. Thus, certain internal and external interfaces have been designed in cellular communication systems to enable a network operator, access provider and/or service provider to provide required information to a Law Enforcement Agency (LEA) to meet LI requirements.

Figure 1:
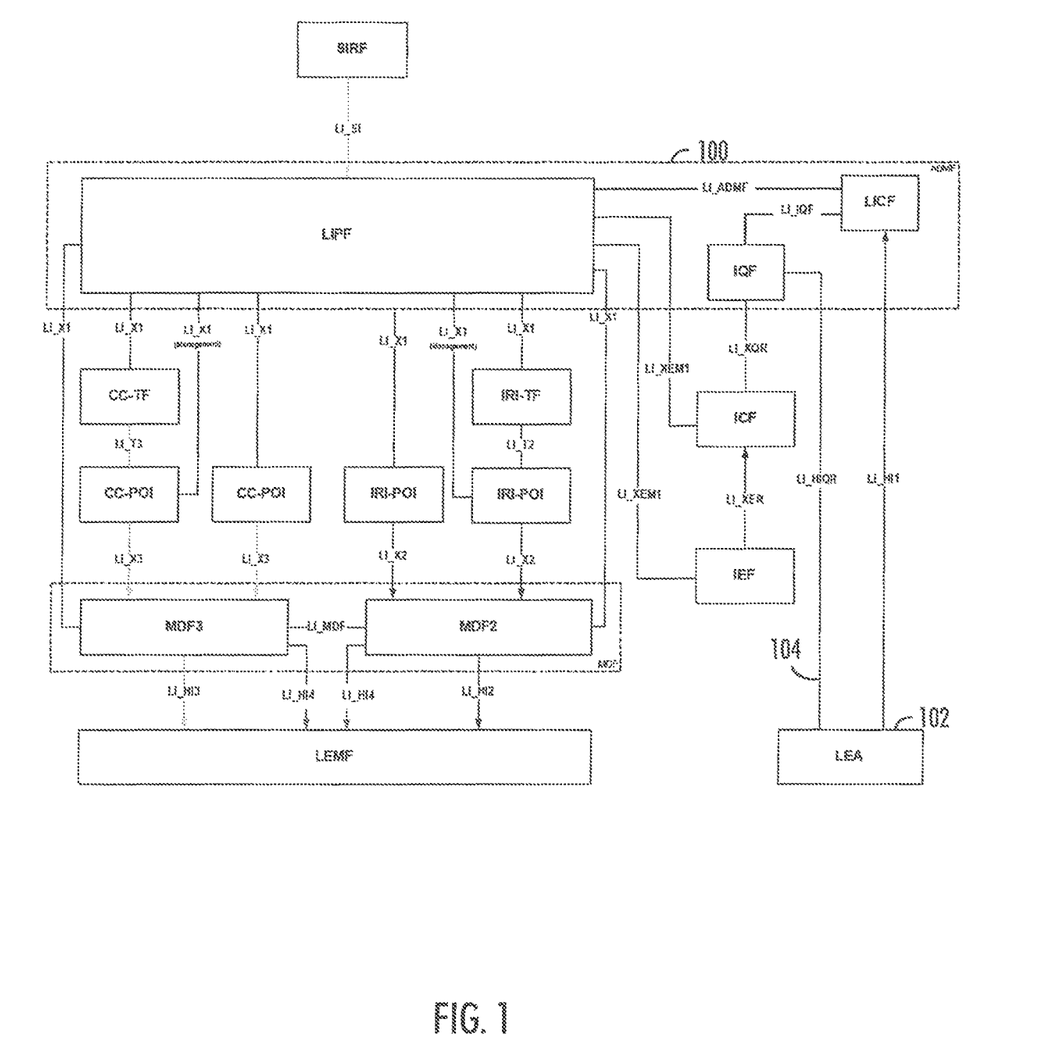
FIG. 1 illustrates an example of Lawful Interception functionalities provided by cellular network operators.

The LI interfaces of the 3GPP technical specification 33.128 v17.5.0 (2022-06) illustrated in FIG. 1 are functionalities provided by the cellular network operators.

The LI Administration Function (ADMF) 100 comprises a Lawful Interception Provisioning Function (LIPF), an Identity Query Function (IQF) and a Lawful Interception Provisioning Function (LIPF). The Identity Query Function (IQF) is connected to the Law Enforcement Agency (LEA) 102 with the Lawful Interception Handover Interface Query Response (LI_HIQR) interface 104. LEA teams can use the LI_HIQR interface for sending queries about 5G identifiers (5G-GUTI, SUCI, 5G-S-TMSI, SUPI) used by cellular phones connected to the 5G SA core network. The interface is based on an internal network database which is updated during Non-Access Stratum (NAS) registration procedures.

Interfaces LI-X1, LI-X2 and LI-X3 are Lawful Interception Internal Interfaces, interfaces LI_HI1, LI_HI2 and LI_HI3 are LI_Handover Interfaces. Interfaces LI_XEM1 and LI_XER relate to event management and LI_XQR relates to Internal Interface Query Response. In the figure, CC denotes Content of Communication, POI denotes Point Of Interception, TF denotes Triggering Function and MDF denotes Mediation and Delivery Function.

In an embodiment, LI is performed utilizing so called fake base stations or Communication intelligence (ComInt) base stations to which the cellular mobile devices connect.

Figure 2:
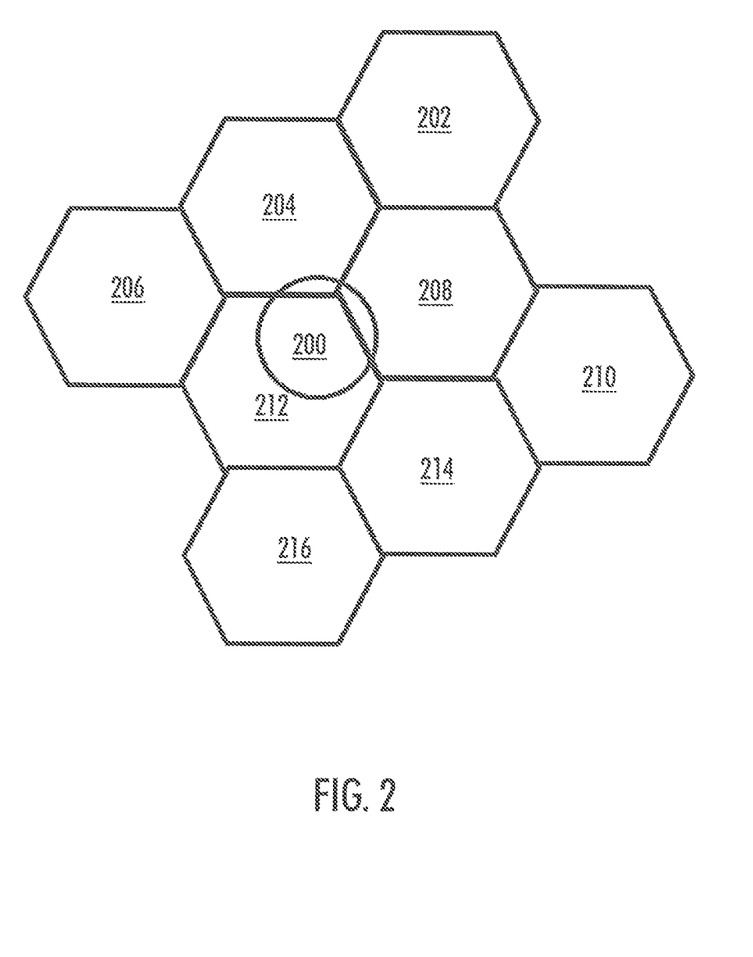
FIG. 2 illustrates an example of the operation area of a network operator.

FIG. 2 shows an example of the operation area of a network operator where a communication intelligence cell 200 created by a fake or ComInt base station is within the area covered by cells 202, 204, 206, 208, 210, 212, 214, 216 created by base stations of the network operator. The fake base station is configured to utilize the same radio technology as the cells of the network operator. Cellular mobile devices in the area see the cell provided by the fake base station as another one of the operator cells. However, the cell of the fake base station is not a part of the cellular operator network. The cells created by the real cellular base stations 202 to 216 support a given base station channel bandwidth defined by the network operator. Further, the operator network provides cells 202 to 216 in the operation area with a downlink radio channel power level.

In an embodiment, the fake base station provides a downlink radio channel, the power level of the downlink radio channel being higher than a downlink radio channel power level utilized in the neighboring cells of the cellular network operator. This makes the fake base station attractive for the mobile devices to connect with.

Figure 3:
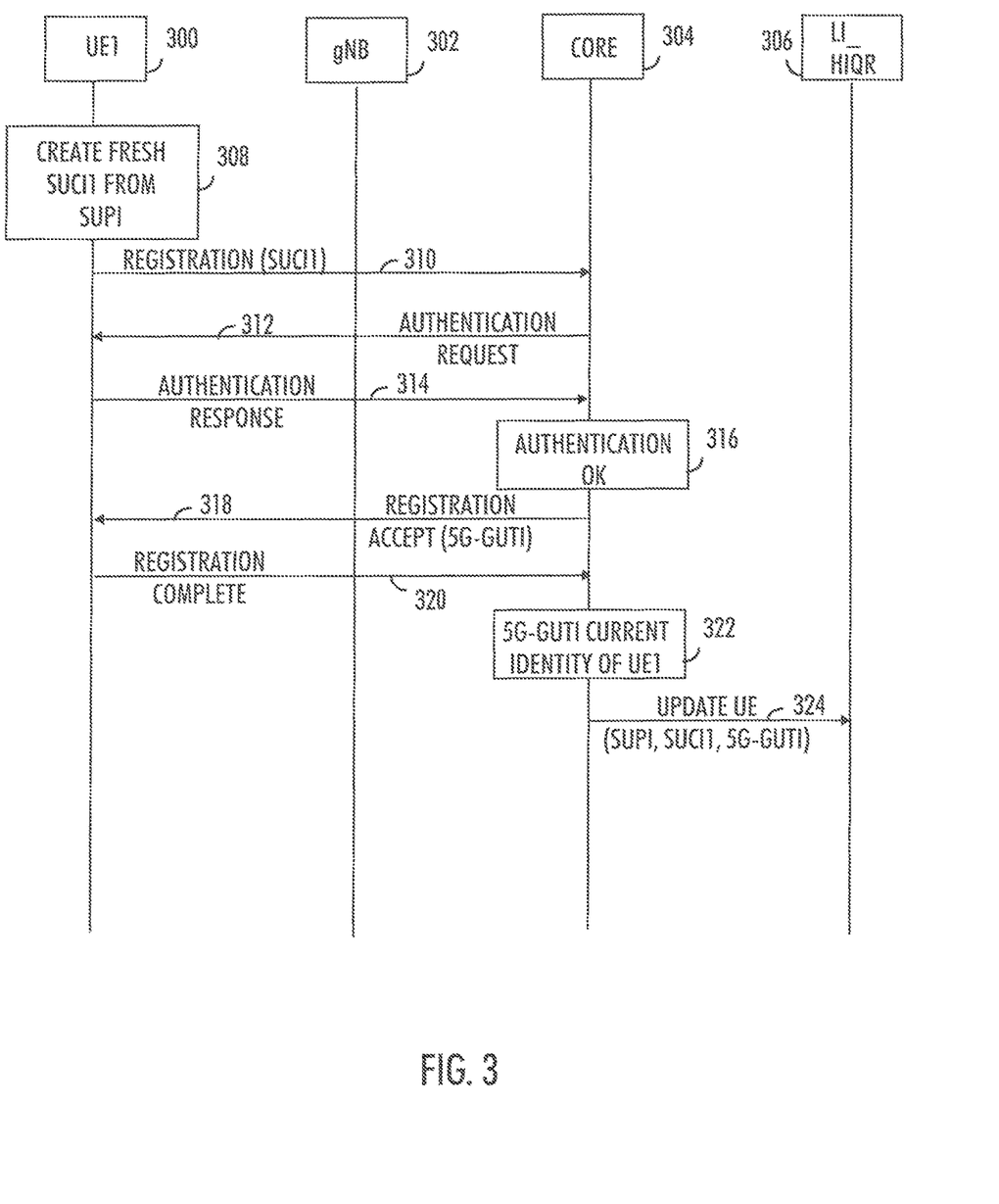
FIG. 3 illustrates an example updating of a LI_HIQR database when a mobile device registers to the network.

FIG. 3 illustrates an example of how the operator network updates the LI_HIQR database when a 5G SA mobile device registers to the 5G SA network using SUCI.

The mobile device 300 is switched on and it creates 308 a SUCI from its SUPI. The terminal (mobile device 300) then transmits a registration message 310 to core network 304. The core network transmits an authentication request 312 to the mobile device which responds with an authentication response 314. The core accepts 316 the authentication and transmits a registration accept with 5G-GUTI. The mobile device transmits a registration complete message 320 to the core. The 5G-GUTI is now the current identity 322 of the mobile device and it is registered 324 using LI_HIQR interface 306 to Identifier Query Function (IQF).

Figure 4:
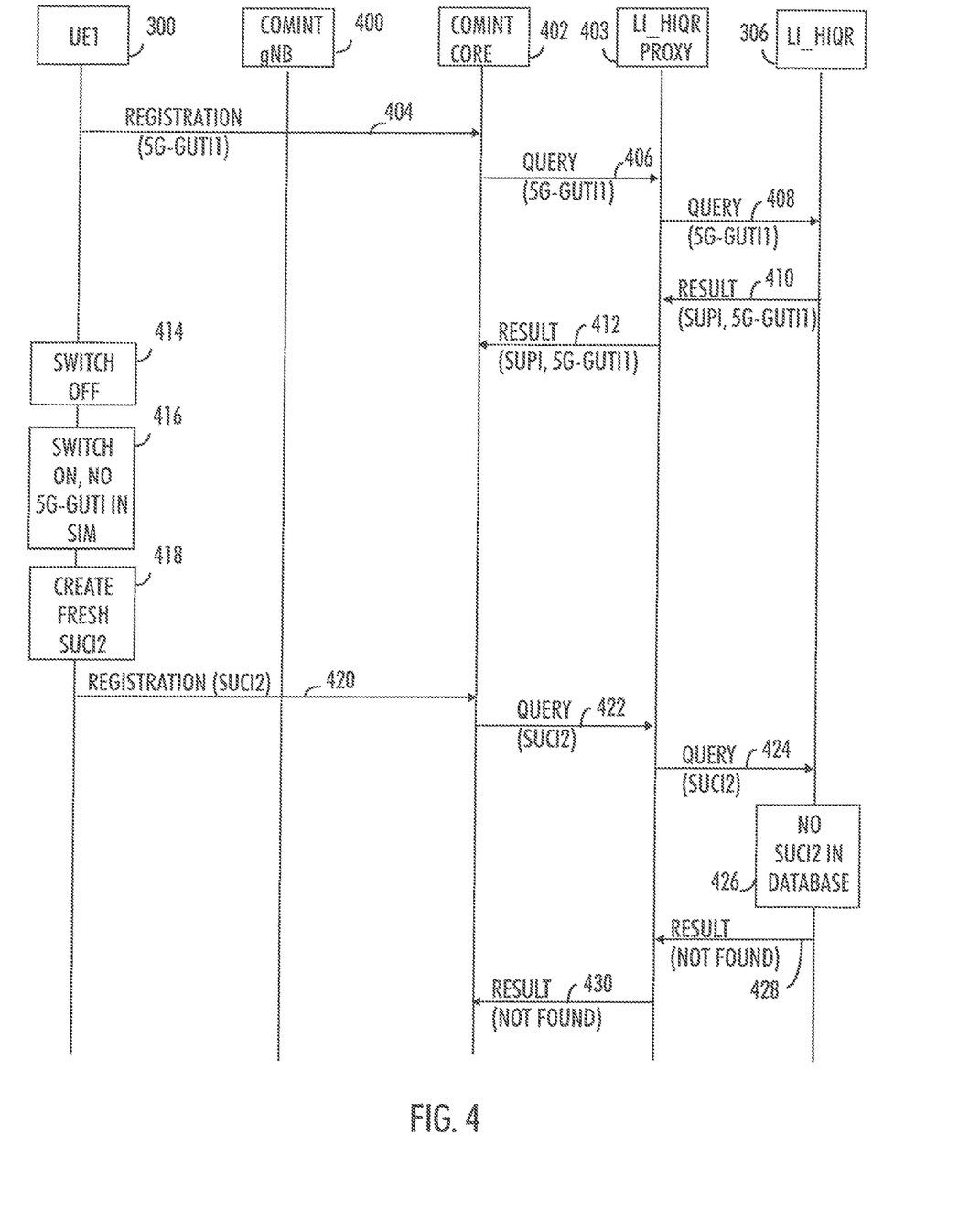
FIG. 4 illustrates an example of a situation where Law Enforcement Agency uses a ComInt base station for collecting identifiers of mobile devices.

FIG. 4 illustrates an example of a situation where LEA uses a ComInt 5G SA base station gNB 400 for collecting 5G identifiers of 5G SA mobile devices.

When LEA uses ComInt 5G SA base station 400, ComInt Core 402 receives a 5G-GUTI value from a mobile device 300 in the NAS Registration Request 404. ComInt Core 402 transmits a query 406, 408 with the 5G-GUTI value via the LI_HIQR interface 306 to IQF. In this example a LI_HIQR proxy 403 is used, which enables connecting to more than one cellular network operator. The IQF searches the internal database of LI_HIQR using the 5G-GUTI and finds the corresponding data. The IQF returns 410, 412 the SUPI, SUCI and 5G-S-TMSI information related to the 5G-GUTI via LI_HIQR interface to the ComInt gNB/Core. The ComInt gNB can now store the SUPI to its own database for future processing.

If the mobile device is switched off 414 and later on switched back on 416, these is no 5G-GUTI in the SIM memory. Thus, a new registration is required by the UE 300. The UE 300 will issue a fresh NAS Registration Request 420 with a different/unique SUCI 418. When ComInt gNB/Core receives a SUCI value encrypted using for example ECIES Scheme A or Scheme B as the 5G identifier from the phone in the NAS Registration Request 420, it can send a query 422, 424 with the SUCI value via LI_HIQR interface to IQF. IQF searches 426 the LI_HIQR database using the SUCI. The result of this database query would be "Not found" because the previously stored SUCI values from the same 5G phone are unique/different. Therefore, the fresh SUCI is not found in the database. The result is replied 428, 430 to the ComInt gNB/Core 402. There is therefore a need to address the SUCI limitation of the LI_HIQR interface.

Figure 5:
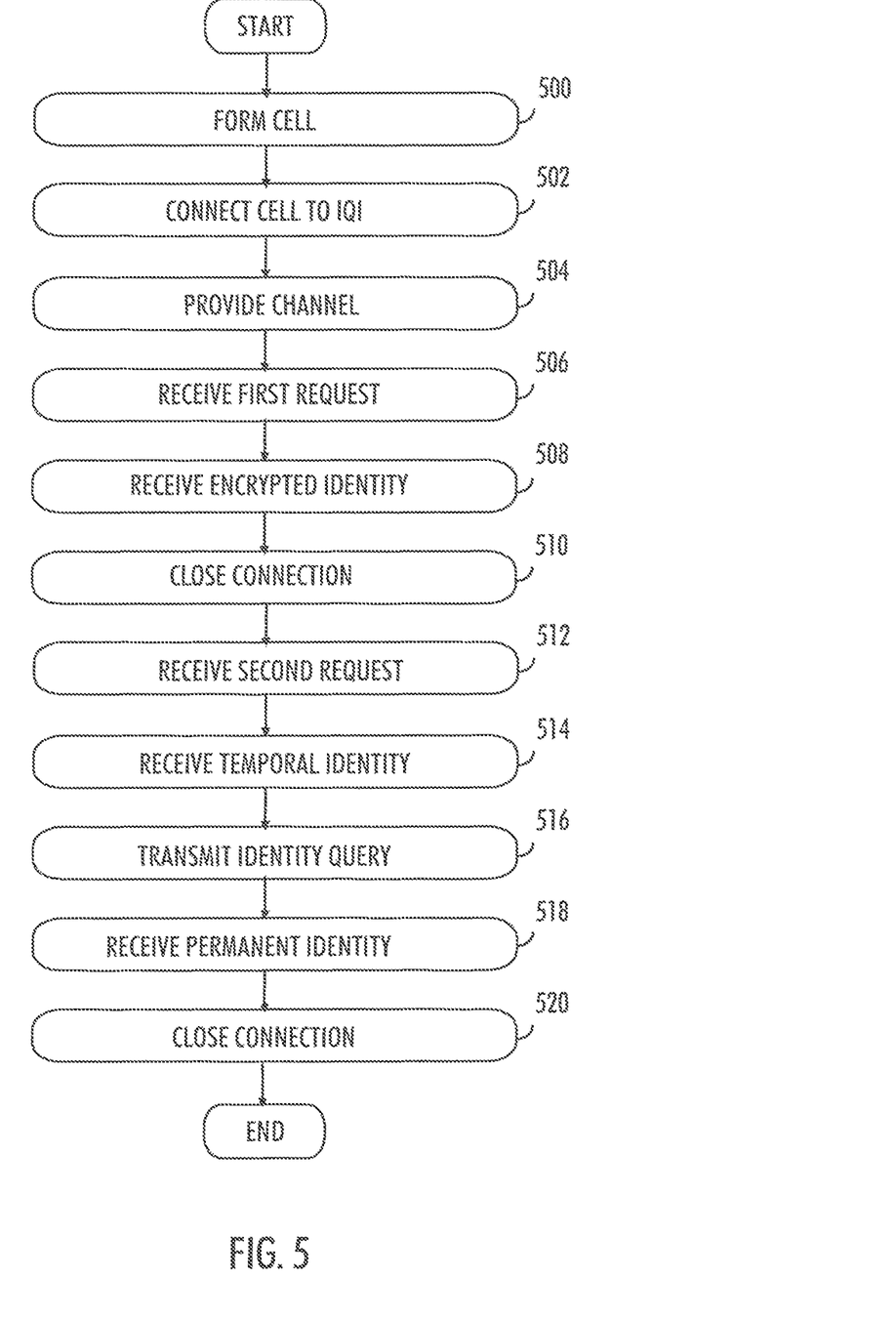
FIGS. 5, 6A, and 6B are flowcharts illustrating embodiments.

FIG. 5 is a flowchart illustrating an embodiment. The flowchart illustrates the operation of an apparatus which may be a fake or a ComInt base station or a part of a fake or a ComInt base station.

In step 500, the apparatus is configured to form a communication intelligence cell for carrying out uplink and downlink communication with cellular mobile devices, the cell having a physical cell identity and a tracking area code unused by neighboring real cells of a cellular network operator.

In an embodiment, the communication system the neighboring real cells belong to a New Radio (NR) or 5G communicating system.

In step 502, the apparatus is configured to connect the cell to the identity query interface (101) of the cellular network operator. Thus, the cell can use the LI_HIQR interface to access the Identifier Query Function (IQF).

In step 504, the apparatus is configured to provide a downlink radio channel in the cell.

In an embodiment, the apparatus is configured to provide a downlink radio channel having a power level higher than downlink radio channel power level utilized in neighboring cells of the cellular network operator. The higher power level is measured by the mobile devices in the area. Typically, mobile devices tend to make a handover to the cell which provides a higher downlink radio channel power level than the other cells in the area.

In an embodiment, the apparatus may be located closer to the mobile devices to be monitored than the base stations of the cellular network operator. This makes the power level of the closer cell greater than the power level of cells located farther away.

In step 506, the apparatus is configured to receive a first registration request from a mobile device.

In an embodiment, referring to FIG. 2, when mobile devices present in the area detect that the communication intelligence cell 200 of the apparatus has higher power level than the surrounding cells 202 to 216 of the network operator and the tracking area code of the ComInt or fake base station is different than that of the operator cells, they may start sending a connection request to the ComInt or fake base station. The higher downlink radio channel power level is attractive to the mobile devices. The ComInt or fake base station will then receive the registration request from the mobile device.

In step 508, the apparatus is configured to receive an encrypted subscriber identity of the cellular mobile device sent from the mobile device.

In step 510, the apparatus is configured to close radio connection to the mobile device.

In an embodiment, the apparatus may be configured to transmit a first registration reject to the mobile device with an error code indicating network error after receiving an encrypted subscriber identity of the mobile device and close radio connection to the mobile device based on the first registration reject. The rejection prevents the mobile device from staying connected to the ComInt or fake base station.

In an embodiment, the apparatus may be configured to reduce power level of the cell for a time period or switch off the cell for a given time period or switch the cell to "barred" for a given time period after sending the first registration reject to the mobile device. When the given time period is passed, the apparatus enables the ComInt cell again. Again, the goal is to disconnect the mobile device from the ComInt or fake base station.

When the mobile device is disconnected from the ComInt gNB, the mobile device may start initiating connection to a neighboring real cell of the cellular network operator of the area where the mobile device is located. The cellular network operator allocates a 5G-GUTI for the mobile device. As soon as the mobile device receives the 5G-GUTI, it stores the value to its SIM card. From the mobile device's point of view, the network has operated as expected and there is no indication to the user that it transitionally connected to a ComInt or fake base station.

In step 512, the apparatus is configured to receive a second registration request from a mobile device.

When the mobile device notices that the ComInt cell with a higher transmission power than the real cells has become available again, it makes another connection request to the ComInt cell this time using the temporary identity 5G-GUTI.

In step 514, the apparatus is configured to receive the temporary identity of the cellular mobile device sent from the mobile device.

In step 516, the apparatus is configured to transmit identity query with the temporary identity of the mobile device to the identity query interface of the cellular network operator. The apparatus can use LI_HIQR interface to access Identifier Query Function (IQF).

In step 518, the apparatus is configured to receive permanent identity SUPI of the mobile device from the query interface. The apparatus can then store this identity information to its own database and associate all identity information about this mobile device.

In step 520, the apparatus is configured to close radio connection to the mobile device.

In an embodiment, the apparatus is configured to store a time stamp of the first registration request of the mobile device to the database.

The apparatus may further be configured to transmit a Radio Resource Connection, RRC, UE capability request to the mobile device after the first and second registration request. When the apparatus receives an RRC UE capability information from the mobile device, it is configured to compare the received RRC UE capability request messages after receiving the permanent identity of the mobile device and indicate potential matching identity of concealed identity and the permanent identity if a time period between the first and the second request has not exceeded.

Once the subscriber identity is collected, it can be used for monitoring and analytics and/or communicated to a separate system (not shown) for further processing.

Further, once the subscriber identity is collected, the fake base station may transmit a reject and disconnect message to the cellular mobile device. Having received a reject message, the behavior of the cellular mobile device depends on the parameters of the reject and disconnect message, operator specific configuration on the SIM card/eSIM of the device and implementation of the cellular mobile device. For example, the cellular mobile device can try to connect to another cellular base station of the same or different cellular radio technology or try to connect to the fake base station again.

In an embodiment, the fake base station may be configured to return to a standby state where it is awaiting to receive connection requests from mobile devices. As will be readily understood, multiple cellular mobile devices can be connected to the fake base station at once.

Figure 6A:
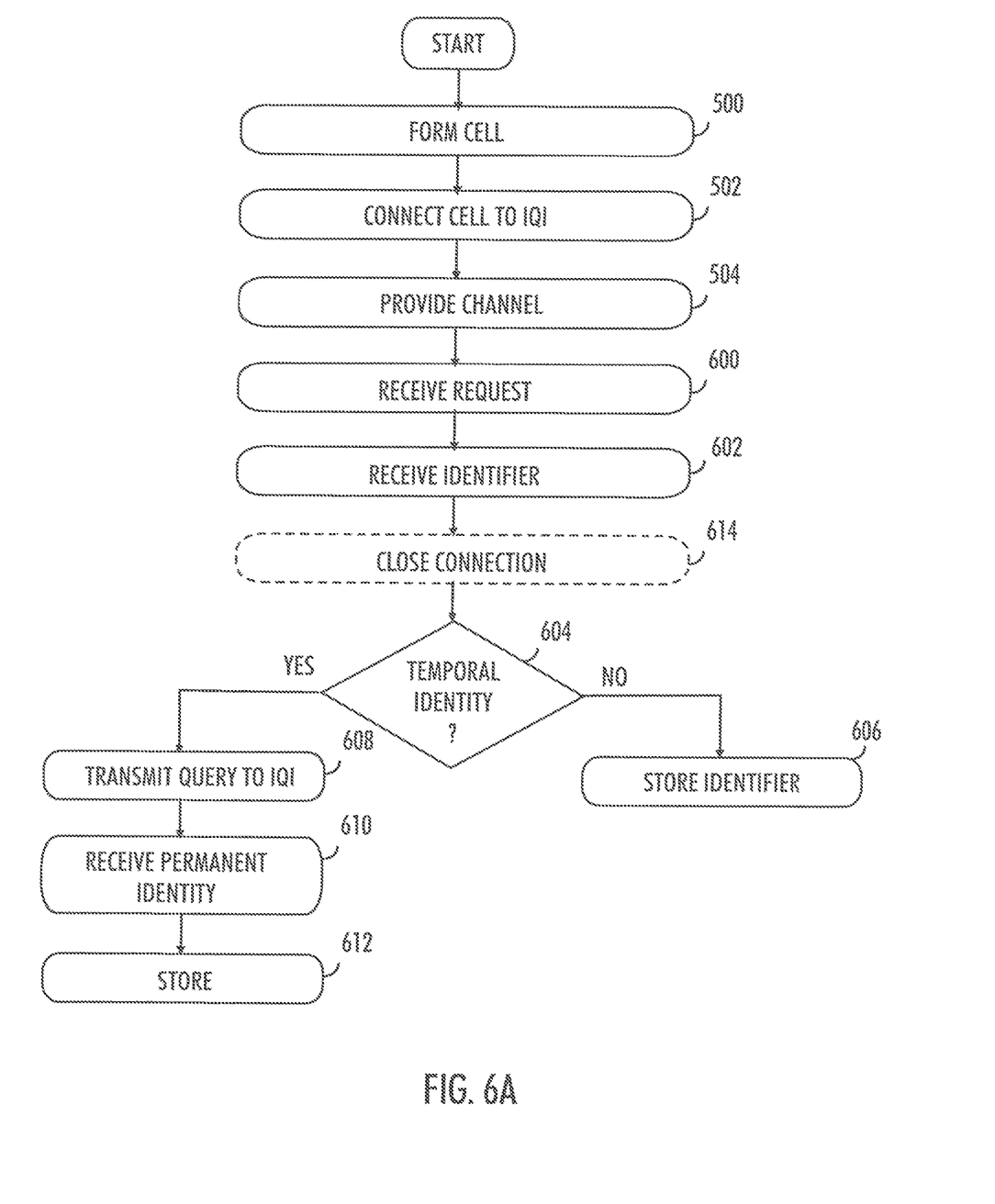

FIG. 6A is a flowchart illustrating an embodiment. The flowchart illustrates the operation of an apparatus which may be a fake or a ComInt base station or a part of a fake or a ComInt base station.

The first steps in the example of FIG. 6A are the same as in the example of FIG. 5.

In step 500, the apparatus is configured to form a communication intelligence cell for carrying out uplink and downlink communication with cellular mobile devices, the cell having a physical cell identity and a tracking area code unused by neighboring real cells of a cellular network operator.

In an embodiment, the communication system the neighboring real cells belong to a New Radio (NR) or 5G communicating system.

In step 502, the apparatus is configured to connect the cell to the identity query interface (101) of the cellular network operator. Thus, the cell can use LI_HIQR interface to access Identifier Query Function (IQF).

In step 504, the apparatus is configured to provide a downlink radio channel in the cell.

In an embodiment, the apparatus is configured to provide a downlink radio channel having a power level higher than downlink radio channel power level utilized in neighboring cells of the cellular network operator. In an embodiment, the apparatus may be located closer to the mobile devices to be monitored than the base stations of the cellular network.

In step 600, the apparatus is configured to receive a registration request from a mobile device.

In step 602, the apparatus is configured to receive, in the registration request, an identity identifier of the mobile device.

In step 604, the apparatus is configured to determine if the identity identifier is an encrypted subscriber identity or a temporary identity.

If the identity identifier is an encrypted subscriber identity, the apparatus is configured to, in step 606, store the identity identifier in a database of the communication intelligence cell. The process ends.

If the identity identifier is a temporary identity, the apparatus is configured to, in step 608, transmit an identity query with the temporary identity of the mobile device to the identity query interface of the cellular network operator. The apparatus can use LI_HIQR interface to access Identifier Query Function (IQF).

In step 610, the apparatus is configured to receive a permanent identity of the mobile device from the query interface and In step 612, the apparatus is configured to store the temporary identity and the permanent identity in the database.

In an embodiment, in step 614, the apparatus is configured to transmit, after receiving a registration request from a mobile device, a registration rejection to the cellular mobile device thereby closing radio connection to the cellular mobile device.

Figure 6B:
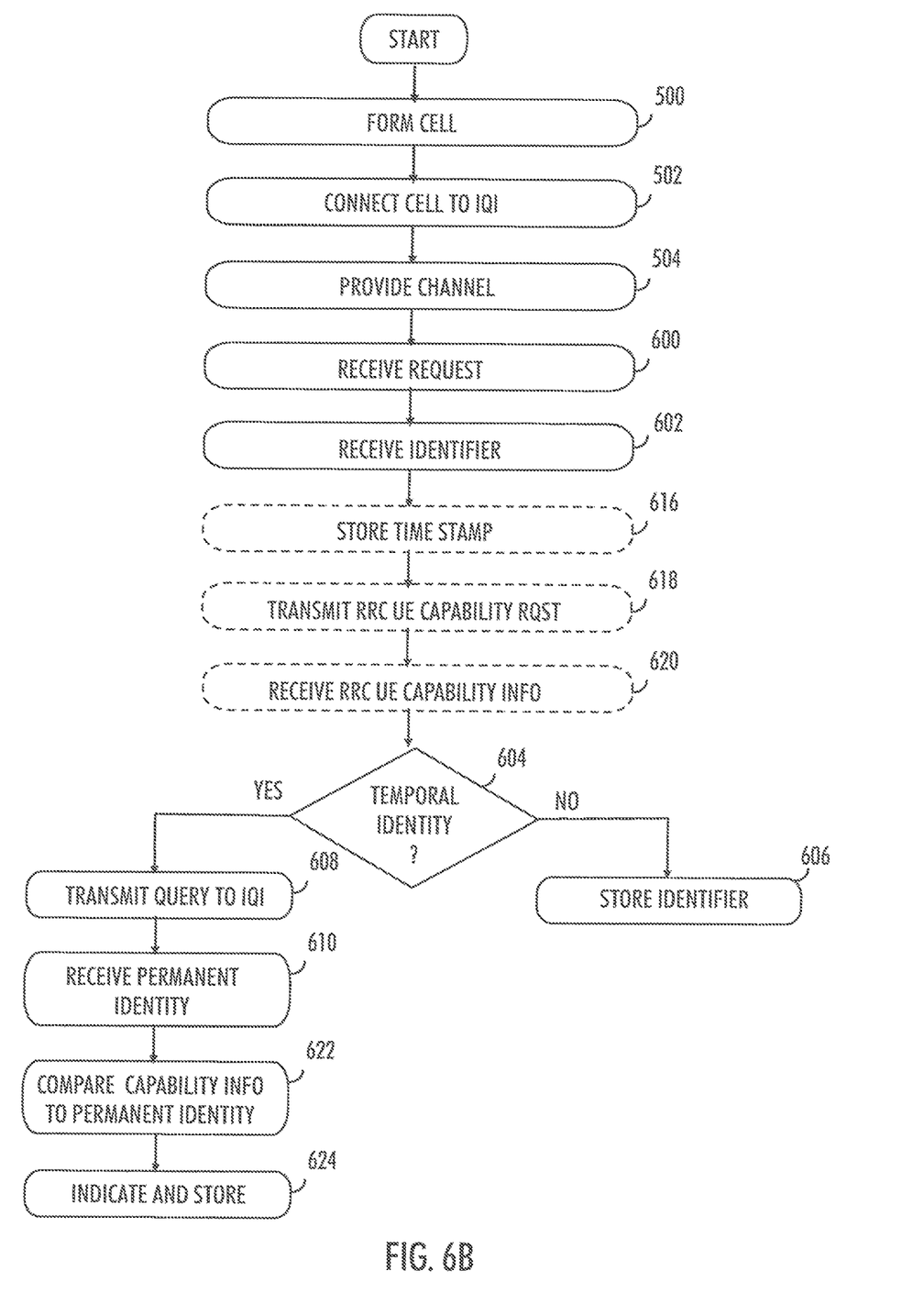

In an embodiment, the process may comprise additional steps. FIG. 6B is a flowchart illustrating an embodiment. The flowchart illustrates the operation of an apparatus which may be a fake or a ComInt base station or a part of a fake or a ComInt base station.

The first steps 500-602 in the example of FIG. 6B are the same as in the example of FIG. 6A and they are not repeated here.

After steps 600 and 602, where a response with an identifier was received from the mobile device, in step 616, the apparatus is configured to store a time stamp for the registration request of the mobile device to the database.

In step 618, the apparatus is configured to transmit an RRC UE capability request to the mobile device after the registration request.

In an embodiment, in step 620, the apparatus is configured to receive RRC UE capability information from the mobile device.

The apparatus is configured to store the timestamp of the Registration Request and content of the RRC UE Capability Information to its own database.

At this time, the apparatus may close connection to the mobile device for example by transmitting a NAS Registration Reject message with error code "Network error" to the mobile phone and disconnect the radio connection to the mobile device. In an embodiment, the apparatus can use other NAS error codes which cause the phone to disconnect from the cell for a moment. In an embodiment, the apparatus may reduce the power level of the cell for short time (for example five seconds) or the cell of ComInt gNB is switched off for a short time or cell status is changed to "barred" for a short time.

Then the process continues as in FIG. 6A, up until receiving the permanent identity of the mobile device from the query interface in step 610. The apparatus is configured to, in step 622, compare the received RRC UE capability information to the permanent identity of the mobile device.

In step 624, the apparatus is configured to indicate potential matching identity of encrypted identity and the permanent identity if a timestamp of the registration request and storing in the database indicates that a predetermined period of time has not exceeded. The apparatus may store the temporary identity and the permanent identity in the database.

Thus, if the same UE Capability Information is found in the database of the apparatus and the timestamp of the previously stored information is within a pre-determined time period (for example five seconds), the apparatus indicates that the SUCI and SUPI are potentially matching identities. The apparatus can then store this bonified identity information to its own database and associate all identity information about this mobile device.

Figure 7:
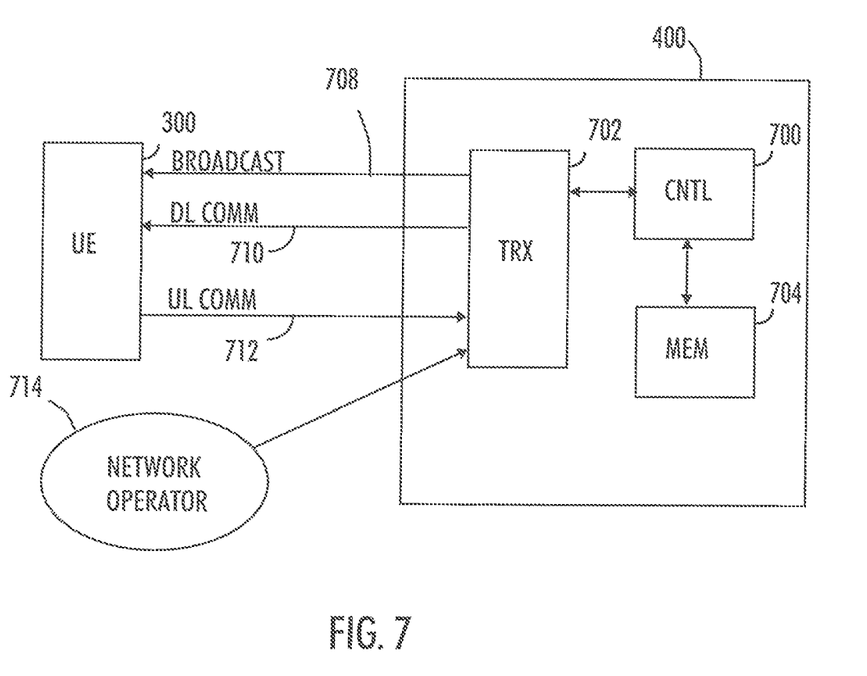
FIG. 7 illustrates an example of an apparatus in which some embodiments may be realized.

FIG. 7 illustrates an example of an apparatus in which some embodiments may be realized. The figure shows a block diagram of an apparatus which may be a ComInt or fake base station or a part of a ComInt or fake base station.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus comprises a controller or control circuitry 700. In an embodiment, the controller is realized with a processor or other circuitry performing corresponding actions. The apparatus further comprises a transceiver 702 operationally connected to the controller 700, and a memory or identity storage 704 operationally connected to the controller 700.

The memory 704 may store data. In an embodiment, identities of cellular mobile devices are stored in the memory. Furthermore, the memory may store software executable by the controller or processor 700. The memory may be integrated in the controller or processor 700.

The transceiver 702 may be configured to scan the network 714 maintained by a network operator to obtain information about the network before the ComInt or fake base station 400 is activated. In an embodiment, the obtained information comprises at least one of radio technology, frequency, bandwidth, subcarrier spacing, physical cell identifier, tracking area code, mobile network code, mobile country code, downlink power level. Once activated, the ComInt or fake base station 400 may broadcast system information 708. It is configured to provide downlink communication 710 and receive uplink communication 712 to/from a cellular mobile device or User Equipment (UE) 300. The controller or processor 700 controls the network scanning and the identity collection process using the transceiver 702 and the identity storage 704. The controller or processor 700 is also configured to handle cellular protocol messages used in uplink 712 and downlink 710 communications with the cellular mobile device or User Equipment 300.

In an embodiment, the controller 700 and transceiver 702 are configured to form a ComInt cell 100 for carrying out uplink and downlink communication with cellular mobile devices, the ComInt cell having a physical cell identity and a tracking area code unused by neighboring real cells of a communication system.

In an embodiment, the controller 700 and transceiver 702 are configured to provide a downlink radio channel power level on a given continuous channel subset of the indicated channel bandwidth, the power level being higher than downlink radio channel power level utilized in real neighboring real cells.

In an embodiment, the controller 700 and transceiver 702 are configured to receive a communication request from a cellular mobile device.

In an embodiment, the controller 700 and transceiver 702 are configured to receive a subscriber identity of the cellular mobile device sent from the cellular mobile device. The subscriber identity may be stored in the memory 704.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a non-transitory computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiments.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system comprising a transceiver, at least one processor; and at least one memory including computer program code, the at least one memory and computer program code configured to, with the at least one processor, cause the apparatus to:
   form a communication intelligence cell for carrying out uplink and downlink communication with cellular mobile devices, the cell having a physical cell identity and a tracking area code unused by neighboring real cells of a cellular network operator;
   connect the cell to an identity query interface associated with the cellular network operator;
   receive one or more registration requests form a mobile device for collecting an identity of the mobile device using the identity query interface; and
   close a radio connection to the mobile device subsequent to the one or more registration requests.

2. The apparatus of claim 1, wherein, to receive the one or more registration requests, the at least one memory and the computer program code, with the at least one processor, are further configured to cause the apparatus to:
   receive a first registration request from the mobile device, with an encrypted subscriber identity of the mobile device sent from the mobile device.

3. The apparatus of claim 2, wherein the at least one memory and the computer program code, with the at least one processor, are further configured to cause the apparatus to:
   subsequent to the first registration request and the radio connection being closed, receive a second registration request from the mobile device with a temporary identity of the mobile device sent from the mobile device;
   transmit an identity query with the temporary identity of the mobile device to the identity query interface;
   receive permanent identity of the mobile device from the query interface.

4. The apparatus of claim 1, wherein, to form the communication intelligence cell for carrying out uplink and downlink communication with mobile devices, the at least one memory and the computer program code, with the at least one processor, are further configured to cause the apparatus to:
   provide a downlink radio channel having a power level higher than downlink radio channel power level utilized in neighboring cells of the network operator.

5. The apparatus of claim 1, wherein, to close the radio connection to the mobile device, the at least one memory and the computer program code, with the at least one processor, are further configured to cause the apparatus to:
   send a first registration reject to the mobile device with an error code indicating network error after receiving an encrypted subscriber identity of the mobile device.

6. The apparatus of claim 1, wherein, to close the radio connection to the mobile device, the at least one memory and the computer program code, with the at least one processor, are further configured to cause the apparatus to:
   send a first registration reject to the mobile device; and
   reduce power level of the cell for a time period or switch off the cell for a given time period or switch the cell to barred for a given time period after sending the first registration reject to the mobile device.

7. The apparatus of claim 6, wherein the at least one memory and the computer program code, with the at least one processor, are further configured to cause the apparatus to:
   send a second registration reject to the mobile device with an error code indicating "no suitable cells in tracking area" after receiving permanent identity of the mobile device.

8. The apparatus of claim 7, wherein the at least one memory and the computer program code, with the at least one processor, are further configured to cause the apparatus to:
   store time stamp of a first registration request of the mobile device to database;
   transmit Radio Resource Control (RRC) User Equipment (UE) capability request to the mobile device after a first and second registration request;
   receive RRC UE capability information from the mobile device;
   compare received RRC UE capability request messages after receiving the permanent identity of the mobile device;
   indicate potential matching identity of concealed identity and the permanent identity if a time period between the first and the second request has not exceeded.

9. The apparatus of claim 1, wherein the one or more registration requests include an identity identifier of the mobile device, and wherein the at least one memory and the computer program code, with the at least one processor, are further configured to cause the apparatus to:
   in response to the identity identifier being an encrypted subscriber identity, store said identity identifier in a database of said communication intelligence cell; and
   in response to the identity identifier being a temporary identity, transmit an identity query with the temporary identity of the mobile device to the identity query interface of the cellular network operator, receive a permanent identity of the mobile device from the query interface and store said temporary identity and said permanent identity in said database.

10. The apparatus of claim 1, wherein, to close the radio connection to the mobile device, the at least one memory and the computer program code, with the at least one processor, are further configured to cause the apparatus to:
    transmit, after receiving a registration request from the mobile device, a registration rejection to the mobile device thereby closing radio connection to the mobile device.

11. A method comprising steps of:
    forming a communication intelligence cell for carrying out uplink and downlink communication with cellular mobile devices, the cell having a physical cell identity and a tracking area code unused by neighboring real cells of a cellular network operator;

connecting the cell to an identity query interface associated with the cellular network operator;

receiving one or more registration requests form a mobile device for collecting an identity of the mobile device using the identity query interface; and closing a radio connection to the mobile device subsequent to the one or more registration requests.

12. The method of claim 11, wherein the receiving comprises:

receiving a first registration request from the mobile device, with an encrypted subscriber identity of the mobile device sent from the mobile device.

13. The method of claim 12, wherein the steps further include:

subsequent to the first registration request and the radio connection being closed, receiving a second registration request from the mobile device with a temporary identity of the mobile device sent from the mobile device;

transmitting an identity query with the temporary identity of the mobile device to the identity query interface; and receiving permanent identity of the mobile device from the query interface.

14. The method of claim 11, wherein the forming includes:

providing a downlink radio channel having a power level higher than downlink radio channel power level utilized in neighboring cells of the network operator.

15. The method of claim 11, wherein the closing includes:

sending a first registration reject to the mobile device with an error code indicating network error after receiving an encrypted subscriber identity of the mobile device.

16. The method of claim 11, wherein the closing includes:

sending a first registration reject to the mobile device; and reducing power level of the cell for a time period or switch off the cell for a given time period or switch the cell to barred for a given time period after sending the first registration reject to the mobile device.

17. The method of claim 16, wherein the steps further include:

sending a second registration reject to the mobile device with an error code indicating "no suitable cells in tracking area" after receiving permanent identity of the mobile device.

18. The method of claim 17, wherein the steps further include:

storing time stamp of a first registration request of the mobile device to database;

transmitting Radio Resource Control (RRC) User Equipment (UE) capability request to the mobile device after a first and second registration request;

receiving RRC UE capability information from the mobile device;

comparing received RRC UE capability request messages after receiving the permanent identity of the mobile device;

indicating potential matching identity of concealed identity and the permanent identity if a time period between the first and the second request has not exceeded.

19. The method of claim 11, wherein the one or more registration requests include an identity identifier of the mobile device, and wherein the steps further include:

in response to the identity identifier being an encrypted subscriber identity, storing said identity identifier in a database of said communication intelligence cell; and in response to the identity identifier being a temporary identity, transmitting an identity query with the temporary identity of the mobile device to the identity query interface of the cellular network operator, receive a permanent identity of the mobile device from the query interface and store said temporary identity and said permanent identity in said database.

20. The method of claim 11, wherein the closing includes:

transmitting, after receiving a registration request from the mobile device, a registration rejection to the mobile device thereby closing radio connection to the mobile device.

* * * * *